March 17, 1931.  J. J. KELLY  1,797,093

SHOCK ABSORBER FOR MOTOR VEHICLES

Filed June 1, 1928

Inventor
James Joseph Kelly,
by
Attorney

Patented Mar. 17, 1931

1,797,093

UNITED STATES PATENT OFFICE

JAMES JOSEPH KELLY, OF LYALLS MILL, AUSTRALIA

SHOCK ABSORBER FOR MOTOR VEHICLES

Application filed June 1, 1928, Serial No. 282,187, and in Australia April 4, 1928.

The object of this invention is to provide a shock absorber for motor vehicles which is preferably positioned near to each end of the front and rear axles of said vehicle. The purpose of said shock absorber is to nullify rebound troubles to which the leaf springs are subject. It is not desired to confine the invention to any exact method of securing same to the vehicle at the positions mentioned, as it is obvious that any suitable securing means may be employed without departing from, or in any way affecting the scope of the invention.

Figure 1:
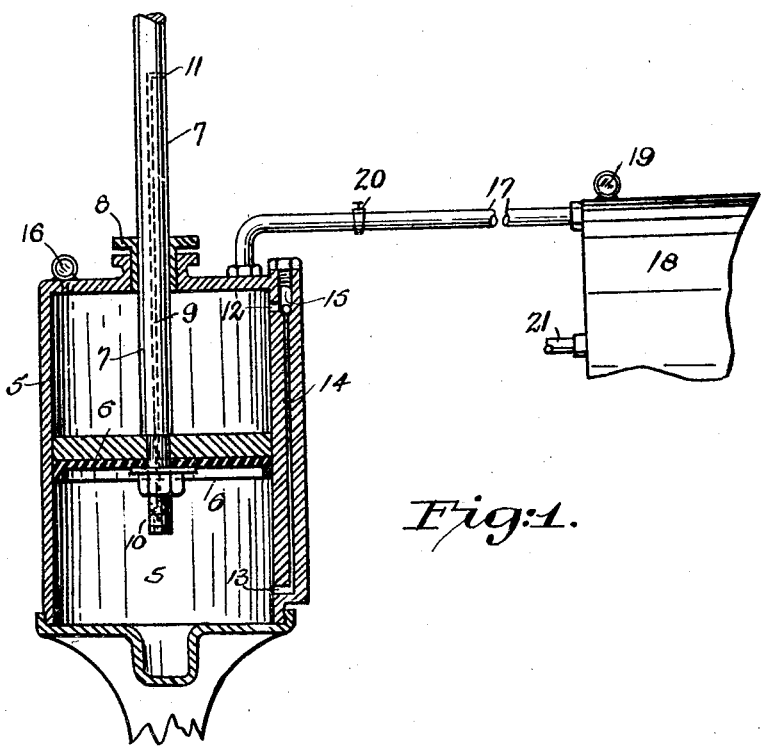
Figure 2:
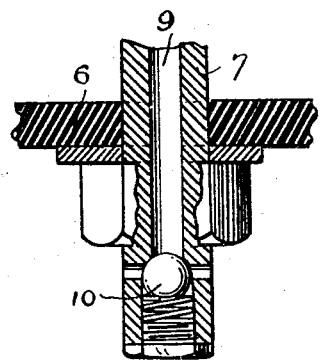

The invention will be described with reference to the accompanying drawings in which Fig. 1 is a sectional elevation thereof and Fig. 2 is an enlarged broken sectional elevation of the lower end of the piston rod showing the check valve mounted in the longitudinal bore of said rod. Since all of the four shock absorbers are of like construction, a description of one will suffice for all.

Referring to said drawings, a cylinder 5, having a head at each of its ends, is secured either rigidly or freely to the axle (not shown) of the vehicle and preferably in the position as above mentioned. Within said cylinder 5, a piston 6 is adapted to work, which piston is carried by one end of the rod 7, the other end of which is rigidly or freely anchored to the underside of the body (not shown) of the vehicle, and at an approved position thereof. The head at the outer end of said cylinder is provided with an opening and a gland 8 in said opening through which the said piston rod 7 works.

This rod 7 has a longitudinal bore 9, communicating with the underside of the piston 6 and with the outer atmosphere through branch passage 11 formed in the piston rod 7.

A check valve 10 is mounted in the bore 9 of the piston rod 7 and is normally held against its seat by a spring. The check valve 10 is adapted to open and permit the passage of atmospheric air to the inner end of the cylinder when the piston is moved toward the outer end of said cylinder.

To one side of the cylinder 5 and communicating through passages 12, 13, with the upper and lower portions thereof, is integrally formed, or secured thereto, an auxiliary chamber 14, the upper of said passages as 12, being controlled by ball or other approved non-return valve 15. The cylinder 5 is provided at its outer end with a safety relief valve 16, of any approved type, and said cylinder communicates through pipe 17 with an air receiver 18, provided with a safety relief valve 19, and the flow of air from the outer end of the cylinder 5 to the receiver 18 is controlled by a suitable check valve 20. This check valve may be of any form which will permit the flow of air from the outer end of the cylinder 5 to the air receiver 18 but prevent the back-flow of air from the air receiver 18 to said cylinder. The air receiver 18 may also be fitted with a pipe 21 for connection to the tires for the inflation of same. It is to be understood that when the piston 6 moves toward the outer end of the cylinder 5, air is admitted to the inner end of said cylinder through the passage 11, bore 7 and check valve 10 and is imprisoned on the inner side of the piston 6 by the ball or other non-return valve 10. The operation of the device is as follows and will be described with reference to one of said cylinders and related members.

Assuming that the vehicle meets with an irregularity of the road, the existing leaf springs tend to straighten out and thus cause the body of the vehicle to move toward the axles, which action, through the piston rod 7, causes the piston 6 to move toward the inner end of the cylinder 5, and force the air contained in the inner portion of the cylinder through the passage 13 into the auxiliary chamber 14, and thence through the passage 12 and non-return valve 15 into the outer portion of the cylinder 5.

When the vehicle has passed said irregularity, the said leaf springs tend to return beyond their normal position, thus raising the body of the vehicle and causing the piston 6, through its rod 7, to move toward the outer end of the cylinder and compress the air within the outer portion of the cylinder 5, thereby forming a cushion, thus counteracting and opposing the otherwise sudden rebound of the said leaf springs and nullifying any shock to same and to the vehicle.

When the air pressure in the outer portion of the cylinder 5 has attained a predetermined limit, the air is led through the valve controlled pipe 17 to the receiver 18 from which it is relieved, upon attaining said predetermined pressure therein, by the safety valve 19.

A further function of the air receiver 18 is that the high pressure air contained therein may be led through pipe 21 and used for inflating the tires of the vehicle, should the driver of latter not have the usual inflator, or be at a distance from an air supply.

It is of course obvious that the cylinder and related members may be used and positioned in a reverse manner to that as above set forth and shown in the drawings, without departing from the scope and object of the invention.

What I claim as my invention and desire to secure by Letters Patent, is:—

1. A shock absorber for mounting between an axle and the supporting frame of a vehicle, comprising a cylinder for attachment to one of said vehicle parts and having a head at each of its ends, a piston working in said cylinder, a piston rod for attachment to the other of said vehicle parts, said piston rod extending through the head at the outer end of said cylinder and connected to said piston, said piston rod having a longitudinal bore extending from the inner side of said piston to the atmosphere, a check valve in said bore adapted to open and admit atmospheric air to the inner side of said piston when the piston is moved toward the outer end of said cylinder, a conduit exterior to the cylinder having its ends connected to said cylinder on opposite sides of said piston, respectively, a check valve in said conduit adapted to open and permit the passage of air from the inner side to the outer side of said piston when the piston is moved toward the inner end of said cylinder, a closed tank connected to the outer end of said cylinder, and a check valve between said cylinder and said tank and adapted to open and permit the passage of air from the outer end of said cylinder to said tank when the air in the outer end of said cylinder is compressed to a predetermined degree.

2. A shock absorber according to claim 1 in which the outer portion of the cylinder is provided with a safety valve for the escape of excess pressure between the piston and the outer head of the cylinder.

In testimony whereof I have hereunto set my hand.

JAMES JOSEPH KELLY.